Patented Sept. 8, 1953

2,651,574

UNITED STATES PATENT OFFICE 2,651,574

PROCESS FOR MAKING CANDIES, CONFECTIONS, ICINGS, AND THE LIKE AND THE RESULTING PRODUCT

Earle O. Whittier, Washington, D. C., dedicated to the free use of the People of the United States No Drawing. Application June 8, 1951,
Serial No. 230,679

9 Claims. (Cl. 99—134)

(Granted under Title 35, U. S. Code (1952), sec. 266)

The invention herein described may be manufactured and used by or for the Government of the United States of America for governmental purposes throughout the world without the payment to me of any royalty thereon.

I hereby dedicate the invention described to the free use of the people in the territory of the United States to take effect on the granting of a patent to me.

This invention relates to a process for the manufacture of candies, confections, icings and similar products. It particularly relates to the manufacture of these products without the use of heat through the application of the principle involved in that property of certain sugars of taking up, or combining with, water whereby the sugar is converted from an anhydrous amorphous form to a hydrated crystalline form, thus decreasing the proportion of free water in the surrounding medium.

One object of this invention is to provide an improved process for making candies, confections and icings containing sugar in the crystalline condition. Another object of this invention is to provide a procedure for regulating the texture, firmness of body, and plasticity of these products. Another object of this invention is to provide a procedure for regulating the size of sugar crystals in candies, confections and icings. A further object of this invention is to provide procedures for manufacturing new types of candies, especially those containing a relatively large proportion of protein and sugar derived from milk and hence of decreased sweetness and of increased nutritive value in comparison with most candies now marketed.

In making candies of both commercial and home-made types, it is the usual practice to boil sugar and water, together with other ingredients, for the purpose of dissolving the sugar and removing sufficient water so that the resulting candy will have the desired firmness. The boiling point of the solution is the usual criterion by which the final proportion of sugar to water is judged.

During the cooling, the mixture is stirred, if it is desired to cause the sugar to crystallize, as for fudge, and the size of the sugar crystals and thus the texture of the resulting candy is regulated. For certain hard candies and non-crystalline candies, stirring is omitted.

By employing the procedures of this invention, candies, icings and similar products, and especially those containing sugar in the crystalline condition and having predetermined characteristics, are manufactured without the use of heat. The size of the sugar crystals in the product is that of the sugar added, since the greater part of the sugar is not dissolved at any time during the making process, and the firmness of the candy or icing is regulated by the ratio of the added water to the lactose in the dried milk product contained in the mix.

One very troublesome property of dried whey and, to a less extent, of dried milks, is the tendency for the individual particles to cohere or cake. This caking is caused by the crystallization of the lactose (milk sugar) in the dried product. As the dried milk product leaves the drier, the lactose is for the most part in an amorphous or glassy condition. On standing, this amorphous lactose takes up water from that in the dried product or from the surrounding air and crystallizes as the monohydrate, thus converting free water into combined water. The process of this invention is based for the most part on the practical utilization of this characteristic of lactose.

I have found that, if finely crystalline sucrose, such as the product sold in stores as powdered sugar or confectioners' sugar, and dried whole milk, dried skim milk, dried buttermilk or dried whey, together with any other desired dry ingredients, such as cocoa, dry coffee extract, spices or nuts, are thoroughly mixed in the dry condition, then moistened with sufficient water or other aqueous liquid sufficient in quantity to form a paste and stirred to distribute the moisture evenly, the product will gradually become firmer over a period of several days, but will continue to have the crystalline texture imparted by the added sugar. Chocolate coatings or foil wrappings may be applied to the product immediately after making or after the firming change has taken place. By altering the proportion of water added, products ranging in characteristics from those of soft fondants to relatively hard dry fudges may be made. If a glucose sirup or an invert sugar sirup is used instead of part or all of the water, products of the nature of taffies and caramels are obtained. A decrease in the proportion of dried milk product in the mix will decrease the amount of hardening that will ensue in the product. The greater the proportion of water added, the relatively softer the final product will be. It is obvious that, by varying the proportions and kinds of ingredients, a wide variety of candies and confections can be made.

The following illustrate applications of my invention, but do not limit the kinds or proportions of ingredients that may be used in addition to the sugar and dried milk product.

Example I 100 parts of confectioners' sugar, 50 parts of dried skim milk, 40 parts of cocoa, and 15 parts of crushed peanut meats were mixed until the mixture was of uniform color. Water was then added in small successive portions and stirring continued until the mixture was a heavy paste. It was then transferred to a greased metal surface in a layer three-fourths inch thick. After standing two hours the mixture was cut into morsel size. Some was coated with chocolate; some was wrapped in foil; and some was neither coated nor wrapped.

Example II 100 parts of confectioners' sugar, 100 parts of dried sweet whey, and 15 parts of chocolate cut to the size of rice grains were mixed and one part of vanilla extract was added. Milk was then added in small portions and mixing continued until the mixture was of a consistency such that it could be poured. It was then transferred to a greased metal surface in a layer approximately one-half inch thick. After standing four hours, it was cut in blocks of morsel size. After twelve hours it was sufficiently firm to be wrapped in foil or coated with chocolate.

I claim:

1. A process for making candy, confections and icings, without use of heat which comprises mixing confectioners' sugar having crystals of the size desired in the finished product, a dried milk product containing lactose in the amorphous form, and dry flavoring materials, adding gradually sufficient aqueous liquid to convert the mixture into a paste, stirring the paste and causing the amorphous lactose of the dried milk product to crystallize as the hydrate.

2. A process as in claim 1, in which the aqueous liquid is water.

3. A process as in claim 1, in which the aqueous liquid is a solution of hexose sugars.

4. A process as in claim 1, in which the aqueous liquid is fluid milk.

5. The product made as described in claim 1.

6. A process for making candies, confections, and icings containing sucrose in crystalline form, without use of heat, in which the texture, firmness of body, plasticity of the product, and size of the sucrose crystals is regulated, the size of the sugar crystals in the product being that of the sucrose added, the greater part of the sucrose remaining undissolved throughout the process, comprising mixing sucrose having crystals of the size desired in the finished product, and a dried milk product containing lactose in the amorphous form taken from the group consisting of dried whole milk, dried skim milk, dried buttermilk, and dried whey, and then moistening with aqueous liquid in quantity to form a paste, and permitting the product to form.

7. The process of claim 6 in which the sucrose is confectioners' sugar, and the dried milk product is dried whey.

8. The process of claim 6 in which the crystalline sugar is substantially the only dry solid sugar added to the mix.

9. The process of claim 7 in which the crystalline sucrose is substantially the only dry solid sugar added to the mix.

EARLE O. WHITTIER.

References Cited in the file of this patent

UNITED STATES PATENTS

| Number | Name | Date |
|---|---|---|
| 2,145,662 | Miner et al. | Jan. 31, 1939 |
| 2,210,856 | Hellwig | Aug. 6, 1940 |
| 2,495,217 | Annarilli | Jan. 24, 1950 |

OTHER REFERENCES

"Everybody's Cookbook," by Lord, Revised Edition, Harcourt, Brace and Company, pages 179, 434 and 435.